United States Patent [19]

Lazik

[11] Patent Number: 5,355,407
[45] Date of Patent: Oct. 11, 1994

[54] PHONE BUSY CIRCUIT

[75] Inventor: George L. Lazik, Woodland Hills, Calif.

[73] Assignee: Astro Science Corporation, Chatsworth, Calif.

[21] Appl. No.: 959,338

[22] Filed: Oct. 13, 1992

[51] Int. Cl.$^5$ .............................................. H04M 1/65
[52] U.S. Cl. ........................ 379/381; 379/82; 379/96
[58] Field of Search .............. 379/80, 82, 381, 96, 379/97, 98, 102

[56] References Cited

U.S. PATENT DOCUMENTS

| | | | |
|---|---|---|---|
| 3,858,008 | 12/1974 | Remec | 379/381 |
| 4,051,326 | 9/1977 | Padagnani et al. | |
| 4,314,103 | 2/1982 | Wilson | 379/80 X |
| 4,759,052 | 7/1988 | Hashimoto | 379/82 X |
| 4,995,074 | 2/1991 | Goldman et al. | |
| 5,003,581 | 3/1991 | Pittard | |
| 5,018,190 | 5/1991 | Walker et al. | |
| 5,086,453 | 2/1992 | Senoo et al. | |

Primary Examiner—James L. Dwyer
Assistant Examiner—Creighton Smith
Attorney, Agent, or Firm—Brown, Martin, Haller & McClain

[57] ABSTRACT

A switching circuit places a load across the TIP and RING signals of a telephone line when the computer is reset and removes the load when the computer accesses a selected memory location. Thus, the telephone line remains in an off-hook state after the computer is reset and remains in that state until the computer executes software that causes the telephone line to return to the on-hook state. The computer may also execute software that causes the telephone line to enter the off-hook state.

14 Claims, 1 Drawing Sheet

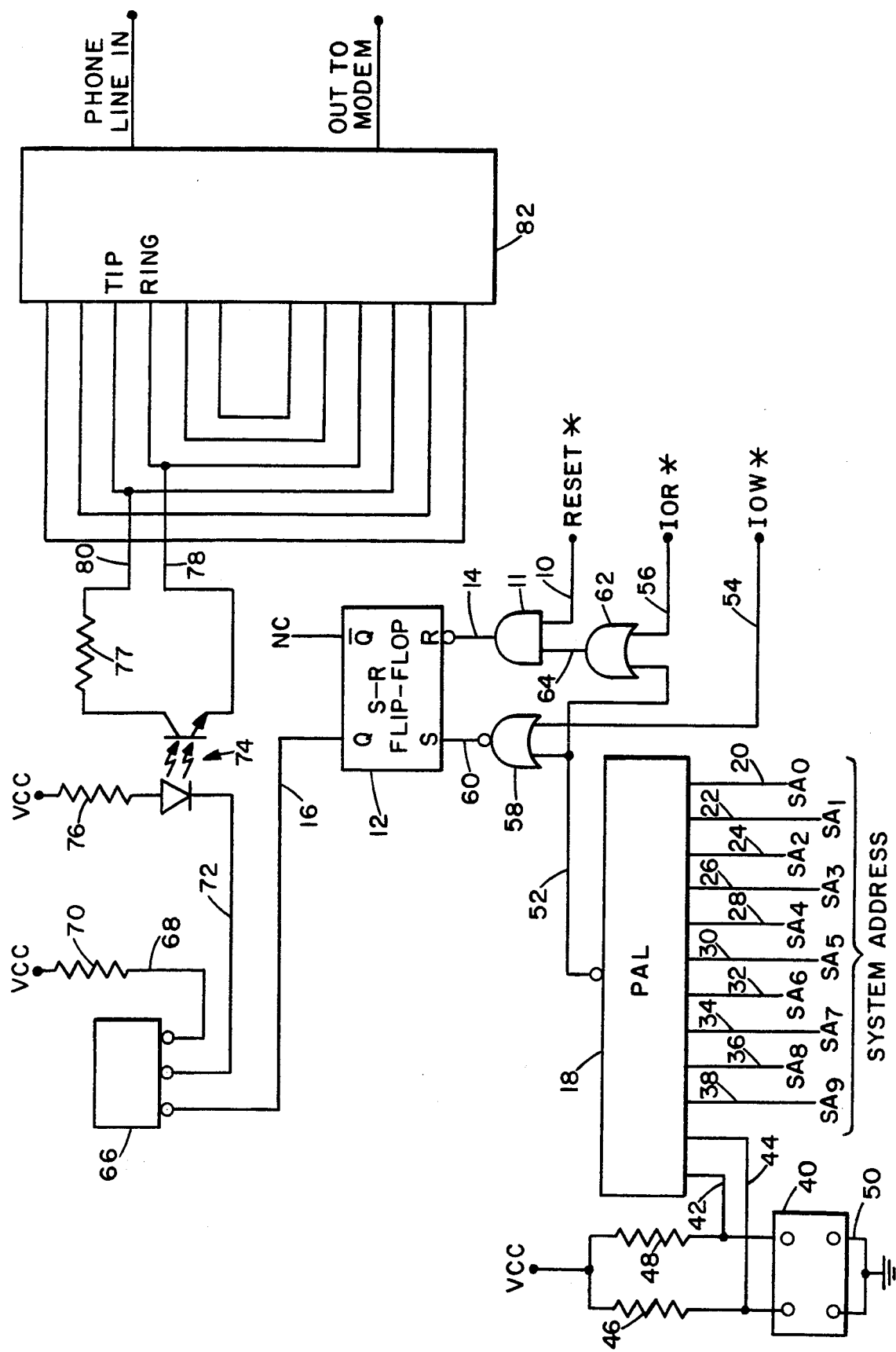

PHONE BUSY CIRCUIT

BACKGROUND OF THE INVENTION

The present invention relates to communication over a telephone line between a host computer and a remote computer and, more specifically, to a circuit for providing a "busy signal" on the telephone line when the host computer is resetting.

A computer connected to a telephone line via a modem may function as a host, receiving a telephone call initiated by a remote computer and establishing a remote computing session between the two computers. A host computer may operate an electronic bulletin board or other service in such a manner.

When the host modem is in an "auto-answer" mode, it responds to the incoming call by placing the telephone line in an "off-hook" state, transmitting a carrier tone, and waiting for a response from the remote modem. If the host modem does not receive a response within about 15 to 30 seconds, it returns the telephone line to the "on-hook" state, i.e., it hangs up. The "off-hook" state exists when a load is present across the TIP and RING signals of the telephone line.

The communications software that the host computer executes may reset or "boot" the host computer from time to time to ensure that the system is returned to a known state. Such software may, for example, reset the host computer each time a remote computing session is concluded.

A problem arises when a remote computer attempts to call the host computer before the host computer is ready to execute its communications software. In such a scenario, the host modem may answer the call, transmit a carrier tone and, after receiving a response form the remote modem, establish communications with the remote modem before the host computer has finished executing its boot routine. Thus, the host computer is unable to respond to the remote computer because the host computer is unaware of the presence of the call. The remote computer must hang up the call and try again.

A similar problem arises when an error in the host computer hardware or software prevents the host computer from completing its boot routine. If the host modem answers an incoming call after such a failure has occurred, the remote computer must hang up the call.

It would be desirable to prevent a remote modem from establishing communications with a host modem before the host computer is ready. This problem is clearly felt in the art and is solved by the present invention in the manner described below.

SUMMARY OF THE INVENTION

The present invention comprises a switching circuit that places a load across the TIP and RING signals of a telephone line when the computer is reset and removes the load when the computer accesses a selected memory location. Thus, the telephone line remains in an off-hook state after the computer is reset and remains in that state until the computer executes software that causes the telephone line to return to the on-hook state.

The circuit may decode the address bus of the computer using any suitable decoder, such as a programmable array of logic (PAL). The circuit may include a selector, such as a bank of switches or jumpers, that is connected to the PAL for selecting among several addresses. Thus, a user may quickly change the address that the computer must access to place the telephone line in the on-hook state.

The circuit may also allow the software to cause the telephone line to be placed in the off-hook state. The computer may, for example, perform a read operation to the selected memory location to place the telephone line in the off-hook state and perform a write operation to the selected memory location to place the telephone line in the on-hook state.

The foregoing, together with other features and advantages of the present invention, will become more apparent when referring to the following specification, claims, and accompanying drawings.

BRIEF DESCRIPTION OF THE DRAWINGS

For a more complete understanding of our invention, the following detailed description of the embodiment illustrated in the accompanying drawing is referred to, wherein the figure is a schematic circuit diagram.

DESCRIPTION OF THE PREFERRED EMBODIMENT

The circuit receives a RESET* signal 10 from a computer (not shown). The asterisk suffix indicates that the signal is active low, i.e., the computer performs a hard reset when RESET* signal 10 is at a logic low. RESET* signal 10 is provided to AND gate 11. When RESET* signal 10 is at a logic low, AND gate 11 places reset input signal 14 of flip-flop 12 at a logic low, thereby resetting flip-flop 12. The flip-flop output signal 16 is at a logic low when flip-flop 12 is reset.

A PAL 18 receives address signals 20-38, which correspond to the least-significant ten bits of the computer address bus. A jumper block 40 provides two address select signals 42 and 44 to PAL 18. Each of address select signals 42 and 44 is connected to VCC through a pull-up resistor 46 and 48, respectively. Thus, a user (not shown) may install a jumper (not shown) between address select signal 42 and ground 50 or between address select signal 44 and ground 50, thereby allowing the user to select one of four different addresses using select signals 42 and 44. Address decode signal 52 is at a logic low when the selected address appears on address signals 20-38.

The circuit also receives write control signal 54 (IOW*) and read control signal 56 (IOR*) from the computer. A NOR gate 58 receives address decode signal 52 and write control signal 54. When both address decode signal 52 and write control signal 54 are at a logic low, the set input signal 60 of flip-flop 12 is at a logic high, thereby setting flip-flop 12. Address decode signal 52 is also provided to an OR gate 62. When both address decode signal 52 and read control signal 56 are at a logic low, signal 64, which is provided to AND gate 11, is at a logic low. Thus, when the software either performs a read operation from the selected address or the computer is reset as described above, reset input signal 14 is at a logic low, thereby resetting flip-flop 12.

A jumper block 66 is connected to flip-flop output signal 16. Jumper block 66 has a pull-up signal 68, which is connected to VCC through a pull-up resistor 70, and a jumper output signal 72. When a jumper (not shown) is connected between jumper output signal 72 and flip-flop output signal 16, jumper output signal is at a logic low after the computer is reset or after the software executes a read operation from the selected address, and jumper output signal 72 is at a logic high after the software executes a write operation to the selected address. However, when a jumper is connected between jumper output signal 72 and pull-up signal 68, jumper output signal 72 remains at a logic high regardless of the state of the computer.

Jumper output signal 72 is connected to the cathode of an opto-isolator 74. The anode of opto-isolator 74 is connected to VCC through a pull-up resistor 76. The emitter of opto-isolator 74 is connected to the RING signal 78 of a telephone line. The collector of opto-isolator 74 is connected to one terminal of a load resistor 77, the other terminal of which is connected to the TIP signal 80 of the telephone line. A plug 82 may have connections for both the telephone line and a modem.

When jumper output signal 72 is at a logic high state, opto-isolator 74 is turned off and no current exists through load resistor 77, thereby placing the telephone line in the on-hook state. A modem (not shown) that is connected to plug 82 will answer an incoming call when the telephone is in the on-hook state and the modem is in auto-answer mode. When jumper output signal 72 is at a logic low state, opto-isolator 74 is turned on and current exists through load resistor 77 and through RING signal 78 and TIP signal 80, thereby placing the telephone line in the off-hook state. A remote caller receives a busy signal when the telephone line is in the off-hook state, and a modem connected to plug 82 will not answer an incoming call.

The computer may, for example, reset after a remote computing session has terminated. The computer must complete the execution of its boot routine before it is ready to receive an incoming call and begin a new remote computing session. Resetting the computer causes the circuit to place the telephone line in the off-hook state. A subsequent remote caller will receive a busy signal. Alternatively, the software can read from the selected address to place the telephone line in the off-hook state. Then, when the computer has finished executing the boot routine, it executes an instruction to write to the selected address to return the telephone line to the on-hook state. A modem connected to the telephone line can then receive incoming calls until the computer is reset again or the computer executes an instruction to read from the selected address.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A circuit for placing a busy signal on a telephone line while a computer is resetting, said telephone line having a TIP signal and a RING signal, said circuit comprising:
    decoder means for receiving a system address from said computer and for providing a decoder output signal in response to access of a predetermined system address by said computer;
    memory means for entering a first state in response to a system reset signal received from said computer and for entering a second state in response to said decoder output signal;
    a resistor; and
    switching means for connecting said resistor between said TIP signal and said RING signal only when said memory means is in said first state.

2. The circuit described in claim 1, further comprising means for selecting said predetermined system address.

3. The circuit described in claim 2, wherein said means for selecting said predetermined system address comprises at least one address selection jumper.

4. The circuit described in claim 3, wherein said decoder means comprises a PAL connected to each said address selection jumper.

5. The circuit described in claim 4, wherein:
    two said address selection jumpers select said predetermined system address from among four addresses programmed in said PAL.

6. The circuit described in claim 4, wherein said access comprises a write operation to said selected predetermined system address.

7. The circuit described in claim 5, wherein said memory means enters said first state in response to a read operation from said selected predetermined decoder address.

8. A circuit for placing a busy signal on a telephone line while a computer is resetting, said telephone line having a TIP signal and a RING signal, said circuit comprising:
    a PAL for receiving a system address from said computer and for providing a decoder output signal in response to access of a predetermined system address by said computer;
    a flip-flop for entering a first state in response to a system reset signal received from said computer and for entering a second state in response to said decoder output signal;
    a resistor; and
    an opto-isolator for connecting said resistor between said TIP signal and said RING signal only when said flip-flop is in said first state.

9. The circuit described in claim 8, wherein said resistor has a resistance of about 620 ohms.

10. The circuit described in claim 9, further comprising a jumper for preventing said opto-isolator from connecting said resistor between said TIP signal and said RING signal.

11. A method for placing a busy signal on a telephone line having a TIP signal and a RING signal while a computer is resetting, comprising the steps of:
    placing a resistor across said TIP signal and said RING signal in response to a RESET signal from a computer; and
    removing said resistor from across said TIP signal and said RING signal in response to access of a predetermined system address by said computer.

12. The method for placing a busy signal on a telephone line described in claim 11, further comprising, before said placing step, the step of selecting said predetermined system address.

13. The method for placing a busy signal on a telephone line described in claim 12, wherein said access is a write operation.

14. The method for placing a busy signal on a telephone line described in claim 13, wherein said placing step further comprises placing a resistor across said TIP signal and said RING signal in response to a read operation to said predetermined system address by said computer.

* * * * *